(12) United States Patent
Carboni et al.

(10) Patent No.: US 12,338,021 B2
(45) Date of Patent: Jun. 24, 2025

(54) PACKAGING DEVICE AND PROCESS FOR ARTICLES TO BE PACKAGED

(71) Applicant: G.D S.P.A., Bologna (IT)

(72) Inventors: Salvatore Carboni, Bologna (IT); Antonio Vitali, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 17/998,094

(22) PCT Filed: Jul. 5, 2021

(86) PCT No.: PCT/IB2021/056000
§ 371 (c)(1),
(2) Date: Nov. 7, 2022

(87) PCT Pub. No.: WO2022/009065
PCT Pub. Date: Jan. 13, 2022

(65) Prior Publication Data
US 2023/0166880 A1    Jun. 1, 2023

(30) Foreign Application Priority Data

Jul. 9, 2020 (IT) .......................... 102020000016654

(51) Int. Cl.
*B65B 35/24* (2006.01)
*B65B 5/10* (2006.01)
(Continued)

(52) U.S. Cl.
CPC .............. *B65B 35/24* (2013.01); *B65B 5/105* (2013.01); *B65B 29/022* (2017.08); *B65B 35/38* (2013.01); *B65B 35/56* (2013.01); *B65B 57/14* (2013.01)

(58) Field of Classification Search
CPC ........ B65B 35/24; B65B 5/105; B65B 29/022; B65B 35/38; B65B 35/56; B65B 57/14;
(Continued)

(56) References Cited

U.S. PATENT DOCUMENTS 6,122,895 A * 9/2000 Schubert .................. B25J 9/026
53/251
6,209,293 B1 * 4/2001 Powers .................. B65B 5/105
53/247
(Continued)

FOREIGN PATENT DOCUMENTS

DE         10064217 A1    7/2002
EP         3235740 A1    10/2017
(Continued)

OTHER PUBLICATIONS

Original and English translation of IT 201700047487 S1 (Year: 2018).*
(Continued)

*Primary Examiner* — Anna K Kinsaul
*Assistant Examiner* — Himchan Song
(74) *Attorney, Agent, or Firm* — Steinfl + Bruno LLP

(57) ABSTRACT

A packaging device and a process for packaging articles arranged according to a predetermined pattern and supplied on a conveyor line are presented, where buffers for the preparation of layers to be packaged are eliminated, while maintaining a high degree of flexibility for a wide range of formats. The packaging device includes one or more transfer devices that pick up the articles and deposit them in layers. The transfer devices have a handling member connected to a respective gripping device, both movable along three orthogonal axes. Each gripping device has gripping elements to pick up an article from the conveyor line. The gripping elements are arranged to form, on each gripping (Continued)

device, a single layer of articles. Each layer is obtained with one or more pickings from the conveyor line, in order to place the articles in a single operation in a respective container of the flow.

22 Claims, 9 Drawing Sheets

(51) Int. Cl.
  *B65B 29/02* (2006.01)
  *B65B 35/38* (2006.01)
  *B65B 35/56* (2006.01)
  *B65B 57/14* (2006.01)

(58) Field of Classification Search
  CPC ....... B65B 35/36; B65B 59/005; B65B 59/04; B65B 5/068; B65G 47/90; B65G 47/91
  See application file for complete search history.

(56) References Cited

U.S. PATENT DOCUMENTS

| | | | | |
|---|---|---|---|---|
| 8,588,960 | B1* | 11/2013 | Nitulescu | B65G 47/682 700/218 |
| 2003/0182898 | A1* | 10/2003 | Huppi | B65B 5/105 198/370.1 |
| 2012/0093625 | A1* | 4/2012 | Monti | B65B 35/44 414/815 |
| 2012/0233967 | A1* | 9/2012 | Bellante | B65D 85/8043 53/539 |
| 2014/0195053 | A1* | 7/2014 | Subotincic | B25J 19/023 294/213 |
| 2017/0036794 | A1* | 2/2017 | Sassi | B65B 5/105 |
| 2017/0355478 | A1* | 12/2017 | Lukes | B65G 47/084 |

FOREIGN PATENT DOCUMENTS

| | | |
|---|---|---|
| EP | 3381818 A1 | 10/2018 |
| IT | 20170004748 A1 | 11/2018 |
| IT | 201700047487 S1 * | 11/2018 |
| WO | 2010/003146 A2 | 1/2010 |

OTHER PUBLICATIONS

International Search Report and Written Opinion for International Application No. PCT/IB2021/056000 filed on Jul. 5, 2021 on behalf of G.D S.P.A. Mail Date: Jan. 3, 2022 25 pages.

* cited by examiner

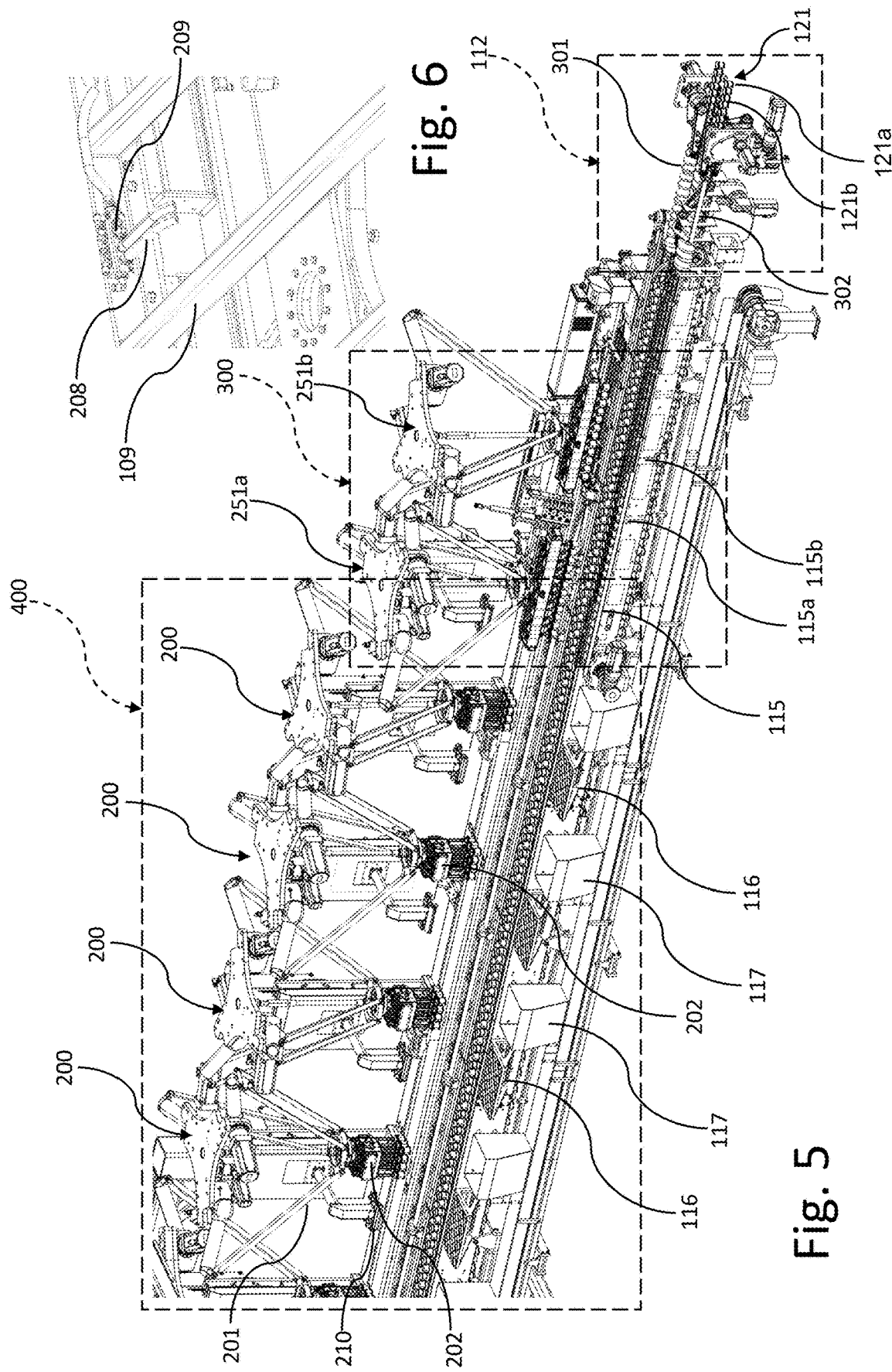

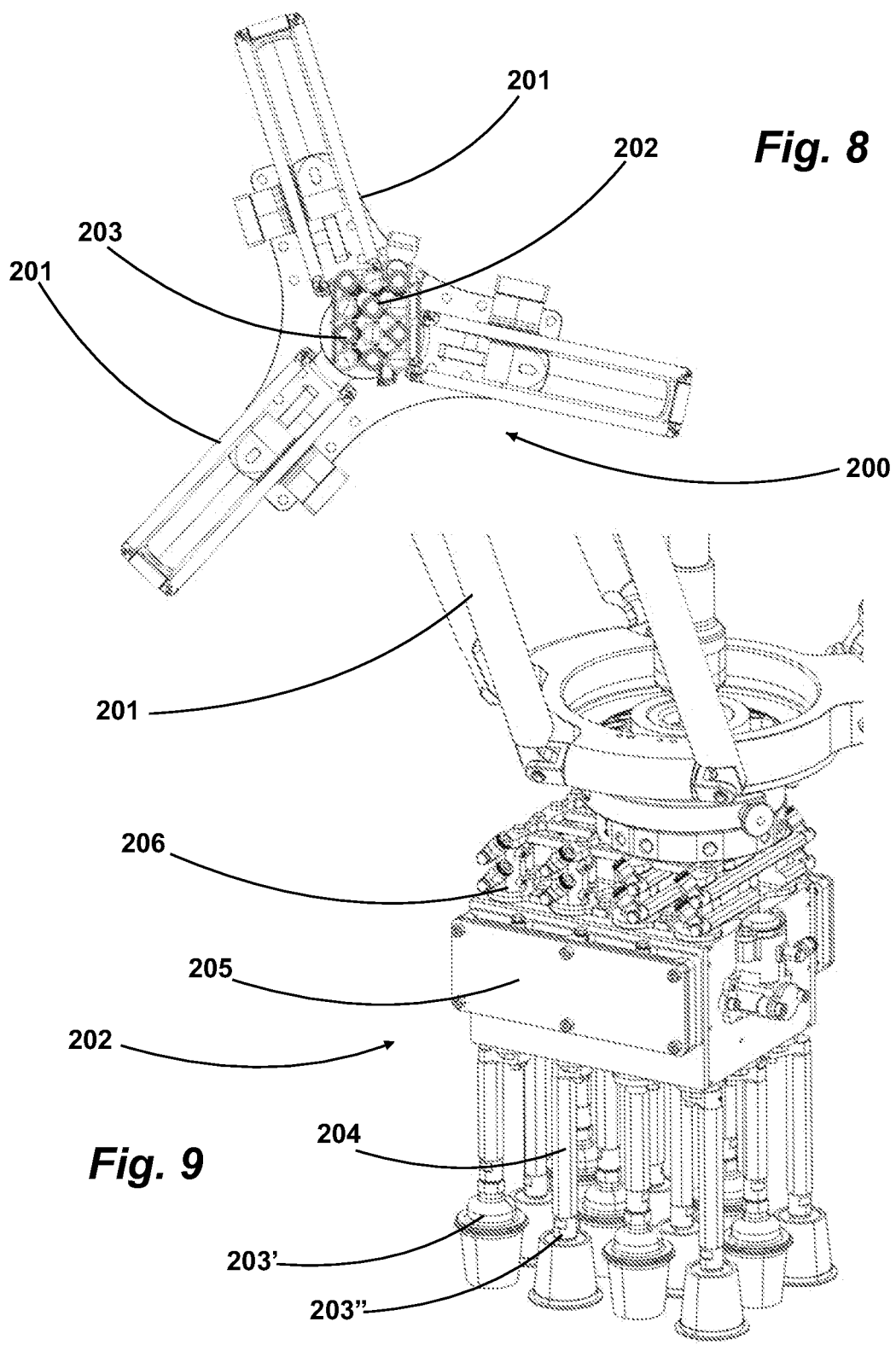

PACKAGING DEVICE AND PROCESS FOR ARTICLES TO BE PACKAGED

CROSS REFERENCE TO RELATED APPLICATIONS

The present application is the US National Stage of International Patent Application No. PCT/IB2021/056000, filed on Jul. 5, 2021, which in turn, claims priority to Italian Application No. IT 102020000016654, filed on Jul. 9, 2020.

The present invention relates to a device and process for packaging articles to be packaged in a packaging apparatus and process.

The present invention finds a preferred, though not exclusive, application in the field of in-box packaging of loose articles, such as capsules for infusion products, for example coffee, a field to which reference may be made hereafter without loss of generality.

In particular, in the relevant technical field, packaging apparatuses are known where the articles to be packaged are arranged according to predefined configurations that allow them to be layed, in general, inside containers that may consist of box-shaped packagings, or that will be used for further steps in the packaging process.

In this description as well as in the accompanying claims, certain terms and expressions are deemed to have, unless otherwise expressly indicated, the meaning expressed in the following definitions.

Here and hereafter, "article to be packaged" means an article intended to be packaged, in a certain number, in a container, such as a box or, in general, packaging.

In particular, it is envisaged that, for this purpose, the articles to be packaged are provided on a conveyor line, which comprises at least two rows of articles to be packaged, according to a particular configuration. This configuration, referred to below as a pattern, is the repetitive pattern in which the articles to be packaged are positioned in said rows, and which is transferred to said packaging. An example of a predetermined pattern, by way of illustration, could be a checkerboard pattern.

The articles to be packaged can be, for example, food and confectionery products already packed in individual containers or wrappers, such as coffee capsules or other infusion drinks, bottles and cartons of beverages, yoghurt pots, individual chocolates (wrapped or bare), candies, small boxes, pouches containing solid, liquid or semi-solid food products; moreover, products of the ceramic industry, absorbent products for hygienic use, products of the tobacco industry, products of the cosmetic industry, products of the pharmaceutical industry, products of the personal & home care industry.

The articles to be packaged may be identical to each other, or they can differ from each other for some characteristic of shape and/or appearance, such as the conformation, the composition, the colour or the orientation with respect to other articles which are intended to be packaged.

Again purely by way of example, an article to be packed is represented by a capsule, i.e. a hollow element of round or cylindrical shape, having the function of a container, of wrapping, of casing, of protection, of covering or closing of a product contained within it, therefore possessing a predetermined shape, in which a head and a bottom are identified, which envisages that it is provided in an upright vertical arrangement, resting on its bottom on a transport plane defined by the respective conveyor line, but which may possibly assume an upturned arrangement, always with respect to a vertical axis, resting on the head opposed to said bottom, where, on the conveyor line, seats, such as recesses and/or supports, may be provided to maintain the element in the aforesaid arrangements, in particular where they do not have a bottom and/or a head apt to act as a stable support base on said transport plane.

One of these positions may be identified as a head-to-head upright arrangement, referred to as an upright arrangement for short, while the opposite position may be identified as a head-to-bottom upturned arrangement, referred to as an upturned arrangement for short.

It is understood that the use of two or more different arrangements may apply to any article to be packaged, in particular where the arrangements chosen are intended to achieve a jointing and/or a better compaction within a target packaging.

Inside the pattern, as defined above, the elements to be packaged constitute a compact assembly in which the respective arrangements and/or types vary within that quantity, but they are equally repeated from assembly to assembly.

In case of capsules, they may be arranged in upright and upturned arrangements in the same predetermined pattern, or with capsules staggered and alternating with each other according to their respective upright or upturned arrangement.

It is understood that the articles to be packaged are continuously fed when they move at a predetermined speed, possibly variable, i.e. subject to acceleration and deceleration, but never nihil. Continuous feeding therefore differs from step feeding, in which the packaging articles move in a step-by-step motion.

By "gripping element" it is meant an element designed to grip, and thus to pick up, and release an article to be packaged, or possibly more than one, for the purpose of transferring it from one conveyor line to another conveyor line, and this other conveyor line may possibly carry packagings in which the articles to be packaged are inserted.

This means that, in the transfer path, the articles to be packaged remain integral with the respective gripping elements that picked them up.

A "transfer device" is a device designed to carry out a transfer of articles which are intended to be packed from a conveyor line to a target container. A transfer device comprises a handling member and a gripping device, movable along three orthogonal axes (X, Y, Z), controlled by said handling member.

"Flow of containers" refers to the feeding of containers on a respective conveyor line in which they are filled with articles to be packaged; for this purpose the containers are fed in an open configuration, i.e. allowing the laying of articles to be packaged inside, without requiring access operations to the container.

It is also understood that this flow can be continuous if the containers are supplied on a conveyor line operated continuously.

"Layered arrangement" refers to the positioning of articles to be packaged, in the container flow, on superimposed planes. In a layered arrangement, the use of a predetermined pattern of the articles to be packaged in each layer can result in a greater compactness of the articles to be packaged, and thus in the packaging of articles in smaller volumes.

"Correct laying" of a layer of articles intended to be packed means a layer that comprises the intended number of articles to be packaged and occupies an intended position in the target packaging.

On the contrary, "incorrect laying" of a layer means the laying of a layer that does not comprise the intended number of articles to be packed and/or does not occupy an intended position in the target packaging.

"Buffer" refers to a station where a quantity of articles which are intended to be packaged is placed to await a further transfer.

A "number" of elements or articles means a quantity of elements or articles that is greater than or equal to two.

"Picking of articles to be packaged from a conveyor line" means a picking from a section of said line, or from a row of articles to be packaged from said line. A single picking can fill the gripping device completely or only partially. In the second case, several pickings may be required to completely fill the gripping device. In particular, several pickings are necessary when the number of articles to be packaged transversely in the gripping device exceeds the number of articles to be packaged transversely in said portion.

The Applicant noted that, in packaging processes, the speed of transfer and insertion of the articles to be packaged into the target packagings is crucial to the overall economics of the process, as high production volumes can be achieved with fewer packaging apparatuses.

Furthermore, the Applicant observed that, in addition to the need to proceed as quickly as possible, another important and unavoidable requirement is the flexibility required of this type of plants, in particular with regard to the different packaging formats, which may contain, for example, a few articles on one or two layers, up to many articles, for example twenty-four (6×4) on a large number of layers, for example five.

This requirement is felt when in case of capsules, they have a substantially truncated conical or truncated pyramidal shape, or equivalent shapes, or other shapes that allow the upright and upturned capsules to be set together in a predetermined arrangement.

By way of example, single small-format packagings and single large-format packagings can be envisaged; a single small-format packaging might contain, for example, two layers each consisting of a single row of three or four capsule elements, or two layers each with 2×3 capsule elements.

On the other hand, a large-format box might contain three 4×5 layers, or four or five 4×6 or 5×6 layers, and it is essential not only that the same plant can ensure these different packagings, but that it can do so with the replacement of a minimum number of parts.

The Applicant also verified that rapid filling of containers fed into a flow appears to be a somewhat promising solution, but this filling can be carried out by a plurality of transfer devices which are arranged along a line of predetermined length, each arranged to feed the containers in the flow.

The Applicant found that, in general, the transfer devices are generally constituted by pick-and-place robotic systems. They pick articles to be packaged from a conveyor line, on which the articles are positioned according to a certain pattern, but a layer in a target container does not necessarily correspond to a portion of the conveyor line.

In addition, the Applicant has verified that the composition of the layer to be deposited could be achieved by means of a buffer, i.e. a support plane on which a pick-and-place transfer device could compose a layer with one or more pickings from the conveyor line. Examples of such systems are described in US patent applications No. 2012/233967 A1 and No. 2012/233967 A1. 2017/355478 A1.

However, the Applicant realised that the use of these buffers, in this feeding process, tends to slow down the flow of the capsule elements, which therefore requires a multiplication of the feeding lines to cope with the volumes that must be transferred.

The Applicant also noted that, for each transfer device of the articles to be packaged from their conveyor line, it is also necessary to provide for an additional filling device which picks the articles to be packaged from the buffers, thereby increasing both the complexity and the footprint of the resulting packaging apparatus.

The Applicant, however, understood that the use of buffers typically implies that the conveyor lines of the packaging apparatus operate with a uniform advance, which have a limited transport speed, which can only be increased by multiplying the conveyor lines, thus making the system more complex.

The Applicant therefore perceived that a different strategy for the composition of the layers to be inserted could make, with the same process speed, the packaging apparatus slenderer and more compact, eliminating many of the complexities mentioned above, with the option of having the conveyor lines of the apparatus operate with continuous advance and not by step, thus also simplifying the mechanics of the conveyor systems.

Finally, the Applicant found that by carrying out the composition of the layer directly on the gripping device of the transfer device, possibly providing for several pickings for each laying of layer according to a strategy that depends on the pattern of the incoming elements to be packaged and the format of the layer, this may allow for a leaner and more compact packaging apparatus, and potentially capable of operating even at higher process speeds.

In particular, in a first aspect thereof, the invention relates to a device for packaging articles.

Preferably, said articles are articles to be packaged and said packaging device is provided for an apparatus for packaging said articles.

Preferably, said articles to be packaged are transported on a first conveyor line.

Preferably, on said first conveyor line the articles to be packaged are transported according to a predetermined pattern.

Preferably, the packaging device comprises a second conveyor line on which a flow of containers is transported.

Preferably, these containers are transported in an open configuration.

Preferably, said containers are apt to be filled with one or more layers of said articles to be packaged.

Preferably, the packaging device comprises one or more transfer devices for picking up articles to be packaged from said first conveyor line.

Preferably, said transfer devices each comprise a handling member and a gripping device.

Preferably, said gripping device is controlled by said handling member.

Preferably, said handling member and gripping devices are movable along three orthogonal axes (X, Y, Z).

Preferably, each gripping device has a plurality of gripping elements each apt to pick up an article to be packaged from said first conveyor line.

Preferably, the gripping elements are arranged in such a configuration that a single layer of articles to be packaged is formed on said gripping device.

Preferably, this layer is obtained by one or more pickings from said first conveyor line.

Therefore, each transfer device deposits a layer of articles to be packaged into a container of said flow.

Preferably, this deposit is made in a single operation.

Thanks to these features, it is possible to create a packaging device that allows eliminating buffers for the preparation of the layer to be inserted into the container, while maintaining a high degree of flexibility that allows the packaging apparatus to package articles in layers with a wide range of formats.

Furthermore, thanks to these features, the packaging machine can be used effectively with conveyor lines that operate continuously, as an alternative to conveyor lines with step advance.

In addition, again thanks to these features, the packaging device operates with fewer transfer devices, but these, in response to a request to increase process speeds and/or the size of the layers to be deposited, can increase in number by simply adding them to the tail of existing ones.

In a second aspect thereof, the invention relates to a process for packaging articles.

Preferably, said articles are articles to be packaged and said packaging process is provided to be implemented by a control system of a packaging apparatus of said articles.

Preferably, the articles which are intended to be packaged are fed on a first conveyor line.

Preferably, the articles to be packaged are arranged according to a predetermined pattern.

Preferably, the articles to be packaged are intended to be packaged in a flow of respective containers.

Preferably, said containers are supplied in an open configuration.

Preferably, this flow of containers is carried out by a second conveyor line.

Preferably, said process comprises a step of picking articles to be packaged from said first conveyor line.

Preferably, the picking step is carried out by means of a plurality of transfer devices.

Preferably, said transfer devices each comprise a gripping device for picking up articles to be packaged from said first conveyor line.

Preferably, said process comprises a step of transferring the articles to be packaged from said first conveyor line to said second conveyor line.

Preferably, said process comprises a step of laying a single layer of articles to be packaged into a respective container of said flow of container.

Preferably, the picking step is such that a single layer of articles to be packaged is formed on said gripping device.

Preferably, said single layer is obtained with one or more pickings from said first conveyor line.

In other words, once the type of layer to be deposited in the container has been selected by means of a control system, i.e. the number of articles to be packaged, the mutual position of each article to be packaged as a function of the pattern on the first packaging line, the overall pattern of each single layer and the shape of the layer, this layer is made up directly on the gripping device with one or more pickings.

In a third aspect thereof, the present invention relates to a packaging apparatus which comprises a device for packaging articles according to the first aspect.

In other words, this apparatus comprises a device for packaging articles to be packaged, in which the latter are picked up from a first conveyor line, forming the layer to be deposited during picking.

In at least one of the aforesaid aspects, the present invention may further comprise at least one of the following preferred features.

Preferably, the packaging device comprises a set of interchangeable gripping devices for each transfer device.

Preferably, each gripping device is provided to form a layer of different sizes on it.

Preferably, said second conveyor line is placed in proximity of said first conveyor line.

Preferably, each gripping element is provided to pick up a single article to be packaged.

Preferably, such a layer is obtained with more than one picking if both sides of the layer exceed, in terms of the number of articles to be packaged, the cross-sectional dimension of the first conveyor line.

Preferably, each transfer device comprises a blocking device which is controlled by a control unit, in order to disable a portion of gripping members.

Preferably, the gripping elements operate by means of suction, said blocking member comprising one or more solenoid valves placed in a suction circuit.

Preferably, said first conveyor line operates continuously.

Preferably, said first conveyor line operates at a predetermined speed.

Preferably, said second conveyor line operates continuously.

Preferably, said second conveyor line operates at a predetermined speed.

Preferably, in the packaging device, said first and said second conveyor lines move in counter-current with respect to each other.

Preferably, in the packaging device said first conveyor line comprises a number of single-row lines of articles to be packaged, arranged in an upright and upturned arrangement according to said predetermined pattern with articles to be packaged staggered and alternating with each other according to the respective arrangement.

Preferably, said predetermined pattern is of the checkerboard type.

Preferably, in the packaging device said first conveyor line comprises a pair of rows of articles to be packaged.

In a preferred embodiment of the present invention, the packaging device comprises one or more image detecting devices which are provided to detect the conformity of the layers laid in the containers by the transfer devices.

Preferably, each image detecting device is positioned at one or more transfer devices, where it is understood that the image detecting device is provided to detect the image the containers downstream of the corresponding transfer device(s), with respect to the flow of containers.

In one embodiment, a respective image detecting device is provided for each transfer device.

Preferably, said one or more imaging devices are connected to a control unit, so that said control unit can receive a signal for correct laying of the layers, or an alarm signal for incorrect laying of the layers.

In this way, the packaging device according to this embodiment is able to carry out the exclusion of incomplete incorrect containers as soon as an incomplete layer, or incorrect laying of articles, is detected, without waiting for the end of the container filling process.

In fact, in the prior art, the control of the correctness of the packaging is carried out by measuring the total weight of a box-shaped packaging once it has been filled, which is uniquely determined by knowing the number and weight of the articles that a box-shaped packaging must contain.

If a packaging has not been filled as intended, it is discarded, with subsequent recovery of the articles that can be fed back into the packaging device.

However, as well as requiring an additional station to weigh and possibly discard incomplete box-shaped packagings, this operation requires the articles to be recovered to be processed manually by an operator, which adds to costs.

Thanks to the aforesaid feature, however, in the packaging device of the present invention the non-conformity of the laying of a layer of articles can be detected immediately, thus avoiding continuing to fill the container intended to be discarded.

Furthermore, thanks to the aforesaid characteristic, it is also possible to detect non-conformities due to an incorrect positioning of articles within a layer, for example if an article is placed at an angle, thus compromising the correct deposit of the next layer and/or the correct closure of the container. It will be noted that such an event of non-conformity would not be detected by a control of the final weight of the container, but would instead require a visual check by an operator.

The articles that would have been inserted container, can be retrieved immediately, and reinserted into the packaging process.

In other words, the packaging device is capable of setting aside, for later reuse, packaging articles that would be intended for a container whose filling does not comply with the instructions given. The containers in which an incorrect filling has been detected will be identified and discarded, while minimising the amount of packaging articles to be reintroduced into the packaging apparatus.

Preferably, in this embodiment, the image detecting devices comprise a camera with a focal spacing corresponding to the spacing between its lens and the layer to be detected.

Preferably, an embodiment of the packaging device according to the present invention comprises a plurality of buffers, arranged in the region of said first conveyor line.

Preferably, they are provided to receive articles to be packaged placed by said transfer devices.

Preferably, in such an embodiment, the transfer devices lay articles to be packaged in said buffers following said alarm signal for incorrect laying of the layers.

In addition, in a preferred version of this embodiment, the buffers comprise support planes which are positioned close to the transfer devices, on which the articles are placed in a predetermined arrangement.

Preferably, said support planes have respective recesses to receive a single article each, identifying said predetermined arrangement.

Preferably, said control unit, by means of the transfer devices, provides for the picking of articles from said buffers for their transfer to subsequent target containers.

Preferably, the packaging process comprises a step of selecting the gripping devices to obtain the required layer size.

Preferably, the packaging process comprises a step of partial deactivation of a gripping device.

The characteristics and advantages of the invention will become clearer from the detailed description of an embodiment illustrated, by way of non-limiting example, with reference to the appended drawings wherein:

FIG. 5 shows a second partial perspective view of the packaging apparatus of the preceding figures, which allows to visualize the device for packaging articles made according to the present invention;

FIG. 6 shows an enlarged view of a detail of the packaging device in FIG. 5;

FIG. 8 shows a plan view from below of a first detail of the transfer device in FIG. 7;

FIG. 9 shows an enlarged perspective view of a packaging device transfer device from FIG. 5;

In the accompanying figures, 100 indicates as a whole an apparatus for packaging articles to be packaged 1, comprising a packaging device 400 made in accordance with the present invention, and a feeder device 300 operating at the head of said packaging device 400.

The embodiment described below refers to articles to be packaged in a container, in particular a box-shaped packaging 30 in which articles that are different from each other, or the same but in different configurations, are arranged in a sorted manner, for example arranged on superimposed layers.

Figure 11:
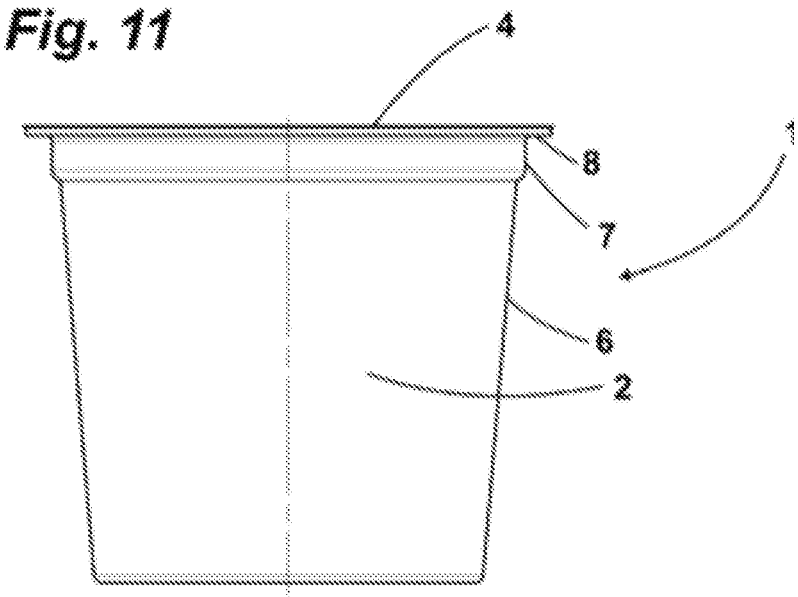
FIG. 11 shows an elevation view of an article to be packaged.
Figure 12:
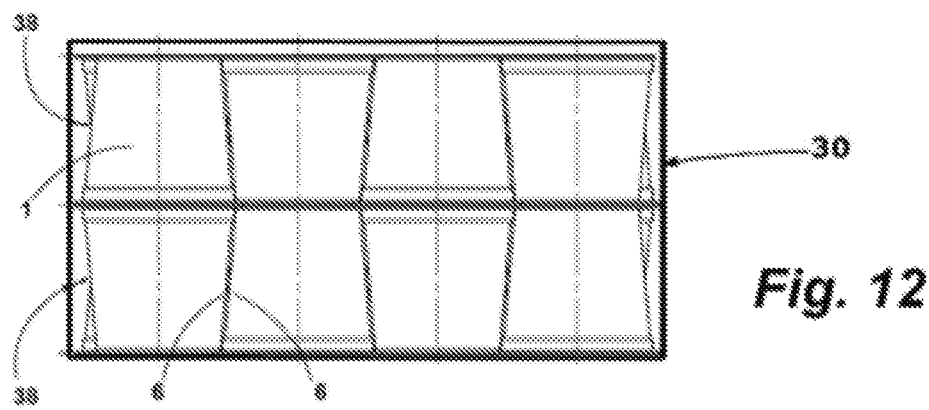
FIG. 12 shows a side view illustrating the arrangement of the articles to be packaged in a container.
Figure 13:
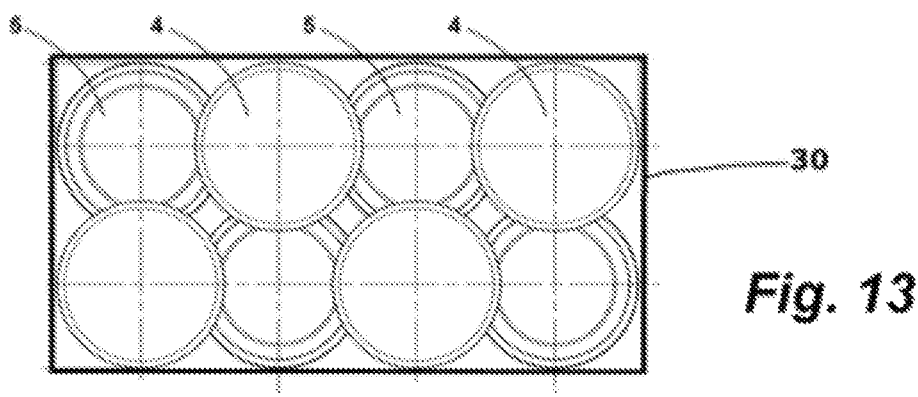
FIG. 13 shows a view from above illustrating the arrangement of the articles to be packaged in the container in FIG. 12.

In this example, with reference to FIGS. 11 to 13, a particular article to be packaged for non-limiting purposes, namely a capsule 1, is contemplated, such as a capsule for the production of beverages by infusion.

The capsule 1 is formed by a substantially rigid casing 2, which has a mouth 3 closed by a lid which, in the present example, is a laminar element that is adhered to the edges of this opening by gluing. The mouth 3 and the lid make a head 4 of the capsule 1, which is opposed to the bottom 5, which will be described below.

The lid 4 is applied to the casing 2 after the latter has been filled.

The casing 2, in the present example, may have a cup shape, i.e. a truncated cone shape having a bottom 5 at the smaller base thereof and inclined walls 6, with a slight flaring, and a top at which said mouth 3 is defined by a circular top edge 7 which has a protruding border 8 or shoulder on the top circumference.

Both the bottom 5 and the top lid 4 are substantially flat, so that the casing 2, i.e., the capsule, can assume a first upright bottom-to-head arrangement, in which the casing 2 rests on the bottom 5, and a second upturned head-to-bottom arrangement, in which the casing 2 rests on the lid 4, i.e., on the circular top edge 7 to which the lid 4 is applied.

In the packaging device 400 and the packaging process according to the present invention, the articles to be packaged are arranged in layers in a target container.

This container is part of a packaging or is directly the packaging, and receives a plurality of layers within it; each layer is composed of articles to be packaged according to a repetitive pattern that depends on the pattern in which the articles to be packaged are only fed to the packaging device.

However, the layer is the result of the composition of articles to be packaged picked from a first conveyor line, that is of one or more pickings made on the conveyor line.

As a result, the layers that are picked up, although respecting the aforesaid pattern, will have an internal arrangement of articles to be packaged that varies from layer to layer.

In general, the differences between layer and layer may, for example, be aimed at achieving a certain overall arrangement of the articles to be packaged in the target container, in order to achieve greater compactness, both within each layer and between adjacent layers.

What is outlined here applies to capsules 1 described above.

In this regard, the packaging apparatus 100 is fed with a semi-finished product for the forming of containers, in particular box-shaped packagings 30 in which the articles to be packaged will be arranged, which, in the present example, is a flat blank made of foldable and semi-rigid material, such as a cardboard suitably cut and provided with folding lines, determined by creasing, to form the walls of a container.

Inside the container, the articles to be packaged are arranged on superimposed layers 38, one of which is located at the bottom of the container.

In the present embodiment, the box-shaped packaging 30 constitutes the container in which the layers of articles to be packaged are deposited superimposed.

If the articles to be packaged are different from each other, in particular if they are of two different types, each layer will be formed in such a manner that the different articles are arranged in a predetermined pattern.

On the other hand, if the articles to be packaged are identical but arranged in different arrangements, in particular in two different arrangements, each layer will be formed in such a manner that the articles in different arrangements are arranged in a predetermined pattern (FIGS. 12 and 13).

In the example described herein, where the articles to be packaged are capsules 1 of the form described above, they will be arranged in the box-shaped packaging in two different arrangements: the aforesaid upright arrangement and the aforesaid upturned arrangement.

In a preferred version of this example, the two configurations will be arranged in each layer 38 in a checkerboard pattern, wherein each capsule 1 in an upright configuration is flanked laterally by elements 1 in an upturned configuration, and vice versa.

In this way, each layer 38 may assume a compact configuration in which the inclined walls 6 of adjacent capsules 1 adhere (or are very close together) to each other. It is understood, however, that the checkerboard pattern is only one of the possible patterns, which may also include honeycomb patterns, or other patterns suitable for particular shapes of the articles to be packaged.

In a preferred version of this example, the capsules 1 of superimposed layers 38 in contact with each other are arranged, within the respective pattern, with the bottoms 5 of capsules 1 of different layers in contact with each other, and with the lids 4 of capsules 1 of different layers in contact with each other. For example, this can be achieved by alternating layers 38 in a checkerboard pattern, in which superimposed capsules 1 in upright configuration and in upturned configuration are alternated from layer to adjacent layer.

In a preferred version of this example, referring in particular to capsules 1 having a circular top edge 7 with a protruding border 8 or shoulder on the top circumference, the capsules 1 of each layer 38 are arranged staggered to each other at a spacing substantially equal to the height of the protruding border 8. In this way, in a compact configuration such as that obtained with the superposition of layers with a checkerboard pattern as described above, the bottom 5 of the capsules 1 will rest on the protruding border of the adjacent capsules, so as to obtain a more compact configuration.

The above compact configurations allow a certain number of capsules to be allocated in smaller containers, with obvious advantages in terms of less space occupied.

The packaging apparatus 100 provided for both forming the containers, that is the box-shaped packagings 30 and for filling them with articles to be packaged, particularly but not exclusively the capsules 1 described above, to obtain a finished packaging intended to be packaged for shipment.

For this reason, the packaging apparatus 100 of the present embodiment is fed with stacks of blanks and with capsules 1, which are supplied in an upright configuration at an inlet section 101.

More in details, the apparatus 100 has a first forming line which is fed at a first inlet end thereof 102 with blanks by means of a feeding station 103; this first forming line assumes a U-shaped configuration by travelling along a curve on a rotating forming carousel 125, which comprises a plurality of forming devices 150.

The feeding station 103 performs the extraction of single blanks and is connected to a folding station 104 in which the blanks are arranged in a configuration in which they are sent on a blanks conveyor 105. In the folding station 104 the blanks undergo a pre-folding of the panels and of the flaps that form the blank. In addition, they are correctly spaced apart from each other, also in view of their format, which may vary according to the box-shaped container 30 which is to be made.

The blanks conveyor 105 travels through a gluing station 106 in which a plurality of hot glue guns lay appropriate glue spots on appropriate flaps of the blanks. It feeds the forming devices 150 rotating on the forming carousel 125, so that each forming device 150 intersecting the final section of the blanks conveyor 105 receives a respective blank in the correct position and already provided with the necessary glue spots.

In the curved section of the forming line, the forming devices 150 form respective box-shaped packagings 30 by means of folding operations of the panels forming the blank, adhering the flaps provided with glue to some of the panels thereof in an appropriate manner.

As will be explained in more detail below, the packaging device 400 is provided to pick and pack articles, supplied on a first conveyor line 115, operating continuously at a predetermined speed.

The packaging device 400, for the purpose of packaging them, inserts and lays the articles which are intended to be packaged into a flow of containers which are conveyed onto a second conveyor line 107, also operating continuously at a predetermined speed, which is arranged in proximity to said first conveyor line 115.

On the second conveyor line 107, a flow of containers is then transported in an open configuration, which are apt to be filled with said articles to be packaged arranged in layers of predetermined dimensions. In particular, this flow transports containers at a predetermined speed, and is therefore continuous.

In this embodiment, the two conveyor lines 107, 115 are arranged one next to the other, developed along essentially parallel straight lines, and operating in counter-current.

As anticipated above, the packaging apparatus 100 has a second inlet section 101 at which the capsules 1 are supplied in an upright configuration in a substantially unsorted manner.

At the inlet section 101, the feeder device 300 for articles to be packaged comprises an inlet line 121 which, in this example, is formed by two inlet rows 121a and 121b (FIG. 5).

The inlet line 121 is connected to a forwarding station 112, wherein the capsules 1 are arranged on said rows 121a, 121b, and wherein a start equipment regulates the passage of the capsules 1 based on feedback that takes into account the operating state of the devices of the following stations.

The feeder device 300 comprises an upturning equipment 301 and a spacer equipment 302, so that after the forwarding station 112 the capsules 1 are spaced apart from each other, and the capsules of one of the rows of the inlet line 121 are upturned, so that the capsules 1 in that row are in an upturned arrangement.

Therefore, the feeder device 300 comprises a conveying line 113 having two rows 113a, 113b of capsules 1, one next to the other, of which one conveys capsules 1 in upright arrangement and the other conveys capsules 1 in upturned arrangement.

The rows 113a, 113b of the first conveying line 113 flank a transfer station 114, wherein the capsules 1 are transferred from the first conveying line 113 to respective rows 115a, 115b of the first conveyor line 115, wherein the arrangements of single capsules 1 are arranged according to a predetermined pick-up pattern.

Between the conveying line 113 and the first conveyor line 115 there are provided, in the transfer station 114 of the feeder device 300, a pair of first transfer devices 251a, 251b realized by respective Delta-type robotic systems, which are arranged in succession, and supported by the cage frame 109 above.

Each first transfer device 251a, 251b comprises a first handling member having a first assembly of three articulated support arms 126, which performs the function of a self-moving transfer arm.

They are provided to transfer a number of capsules 1 from a single row of the conveying line 113, which will then be either all in upright or all in upturned arrangement. Each transfer device has a respective gripping device 127 with a plurality of gripping elements 128 to each grip a single capsule 1 in any arrangement.

During the transfer, the gripping elements 128 move by staggering the capsules 1 that have been picked up from each other, so that they can be arranged on the first conveyor line 115 in a position compatible with the pick-up pattern, which the first transfer devices compose during their operation.

It should be noted that, in this transfer process, the capsules 1 are transferred with a direct transfer path, in which the capsules picked up from the conveying line 113 are at least partially staggered to each other during their path and, without intermediate stops, are laid on the first conveyor line 115 according to a predetermined pattern.

In this way, a checkerboard pattern is obtained on the first conveyor line 115.

The number of the rows 121a, 121b of the inlet line 121 coincides with the number of the rows 113a, 113b of the conveying line 113 and the number of rows 115a, 115b of the first conveyor line 115, i.e. two.

The transfer between the two lines 107, 115 is carried out by the packaging device 400 which comprises a succession of second transfer devices 200, made by robotic systems, in particular the Delta type.

In the embodiment described herein, the aforesaid succession comprises six transfer devices. However, it is understood that even a single transfer device could be operated according to the present invention.

Each second transfer device 200, comprises a handling member, in particular a second assembly of articulated arms 201, and a second gripping device 202 controlled by said handling member, movable along three orthogonal axes, (X, Y, Z).

The second robotic transfer devices 200 are supported by the cage frame 109 above.

A control unit 500 of the packaging apparatus 100 controls the first transfer devices 251a, 251b and the second transfer devices 200 and, in this regard, it comprises a collection of laws of motion and relevant trajectories that determine the motion of the second transfer devices 200.

The aforementioned control unit 500 of the packaging apparatus 100 controls the second transfer devices 200, and receives as input the characteristics of the layers to be deposited in the box-shaped packagings, in particular their number and their format, and the presence of any incomplete layers to be deposited as a layer on top of the layers already deposited, as the last layer.

Therefore, each second transfer device 200 is apt to pick up, from said first conveyor line 115, an entire single layer of predetermined dimensions of articles to be packaged by forming on it said predetermined pattern.

Since the layer may have a width greater than that of the two rows 115a, 115b of the first conveyor line, each gripping device 202 may make multiple pickings from the first conveyor line 115, forming for example a layer of 3×4 format, requiring two consecutive pickings, or a 4×6 layer, which also requires two pickings from a longer section of the first conveyor line 115.

The pickings therefore precede the transfer step and the insertion step in capsules 1, so that the insertion of a single layer 38 into a target box-shaped packaging takes place in one operation.

In order to be able to manage a quantity of layers of different sizes, the second packaging device 400 comprises, for each second transfer device 200, a set of interchangeable gripping devices 202, so that each gripping device in the set is provided for the entire range of layers that the packaging device 400 can handle.

The second gripping device 202 comprises a plurality of gripping elements 203, each apt to pick up a single capsule 1, which are supported by a respective support 204 protruding from a body 205 of the second gripping device 202.

In order to achieve the greatest possible compactness, the gripping elements 203 may be brought close to one another and staggered to each other by a drive equipment 206 contained in said body 205.

Figure 1:
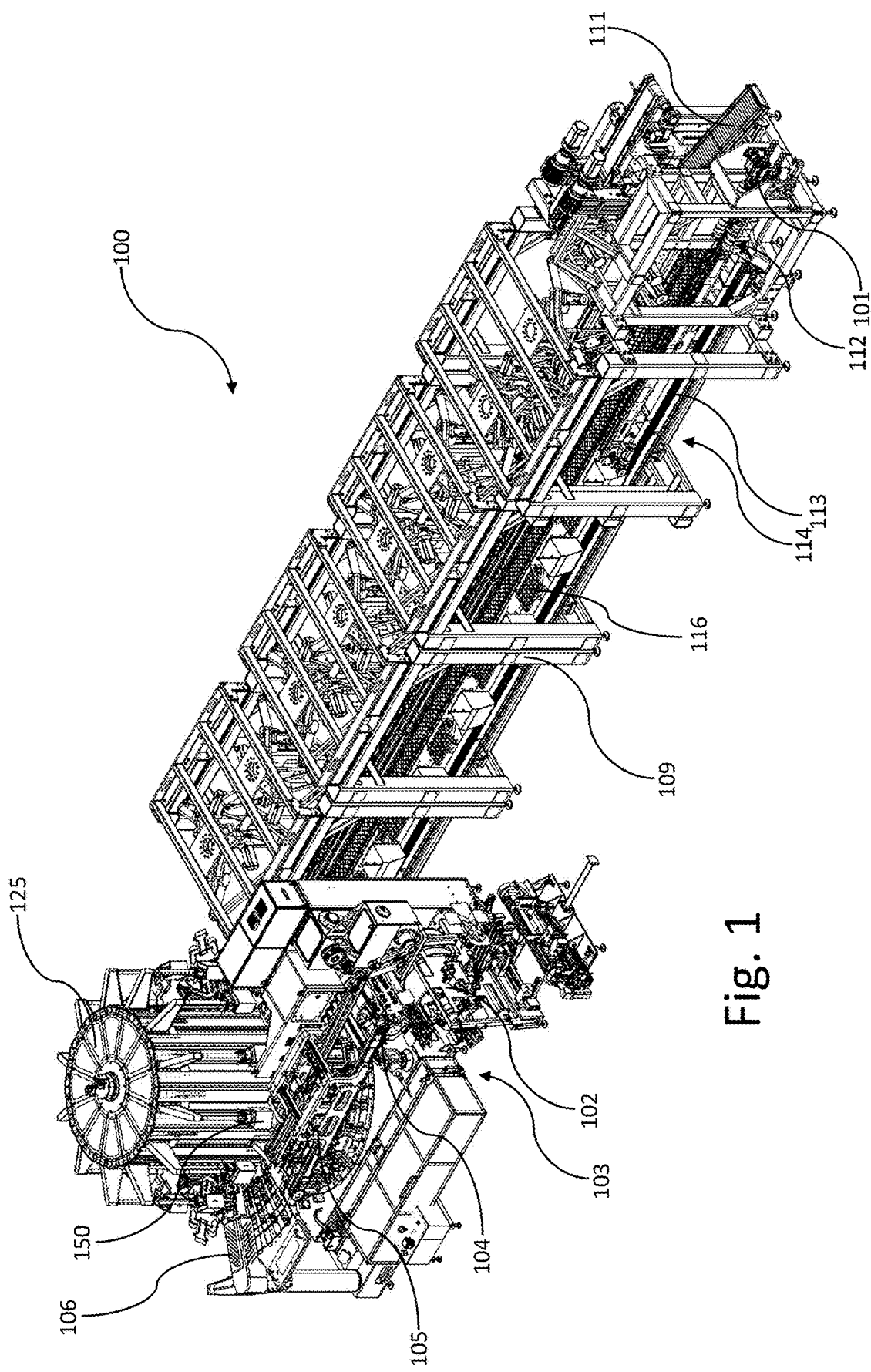
FIG. 1 shows a first perspective view of an example of an embodiment of a packaging apparatus comprising a device for packaging articles according to the present invention.
Figure 2:
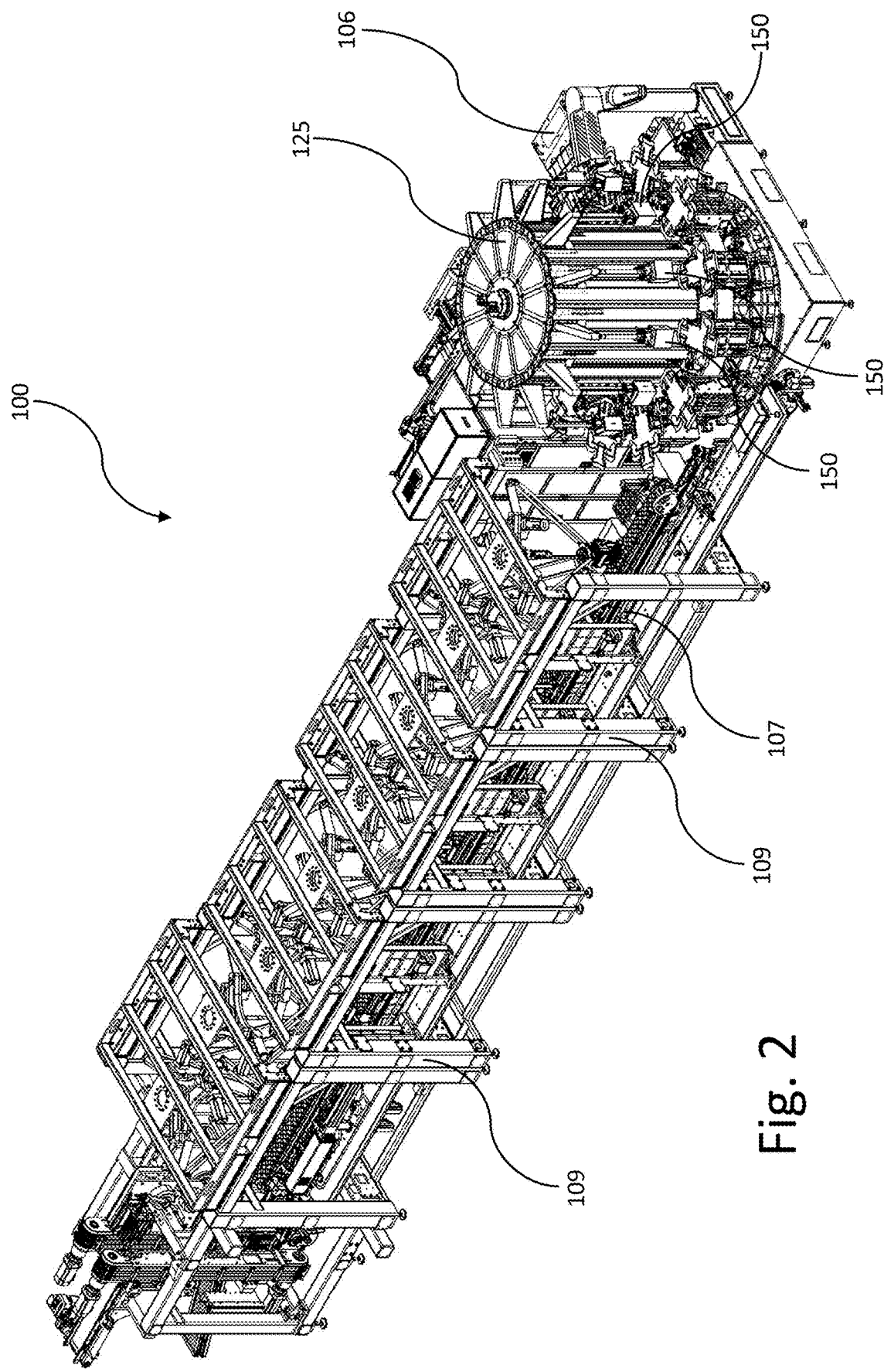
FIG. 2 shows a second perspective view of the packaging apparatus of FIG. 1, from a different point of view to that of the previous figure to show the opposite side.
Figure 3:
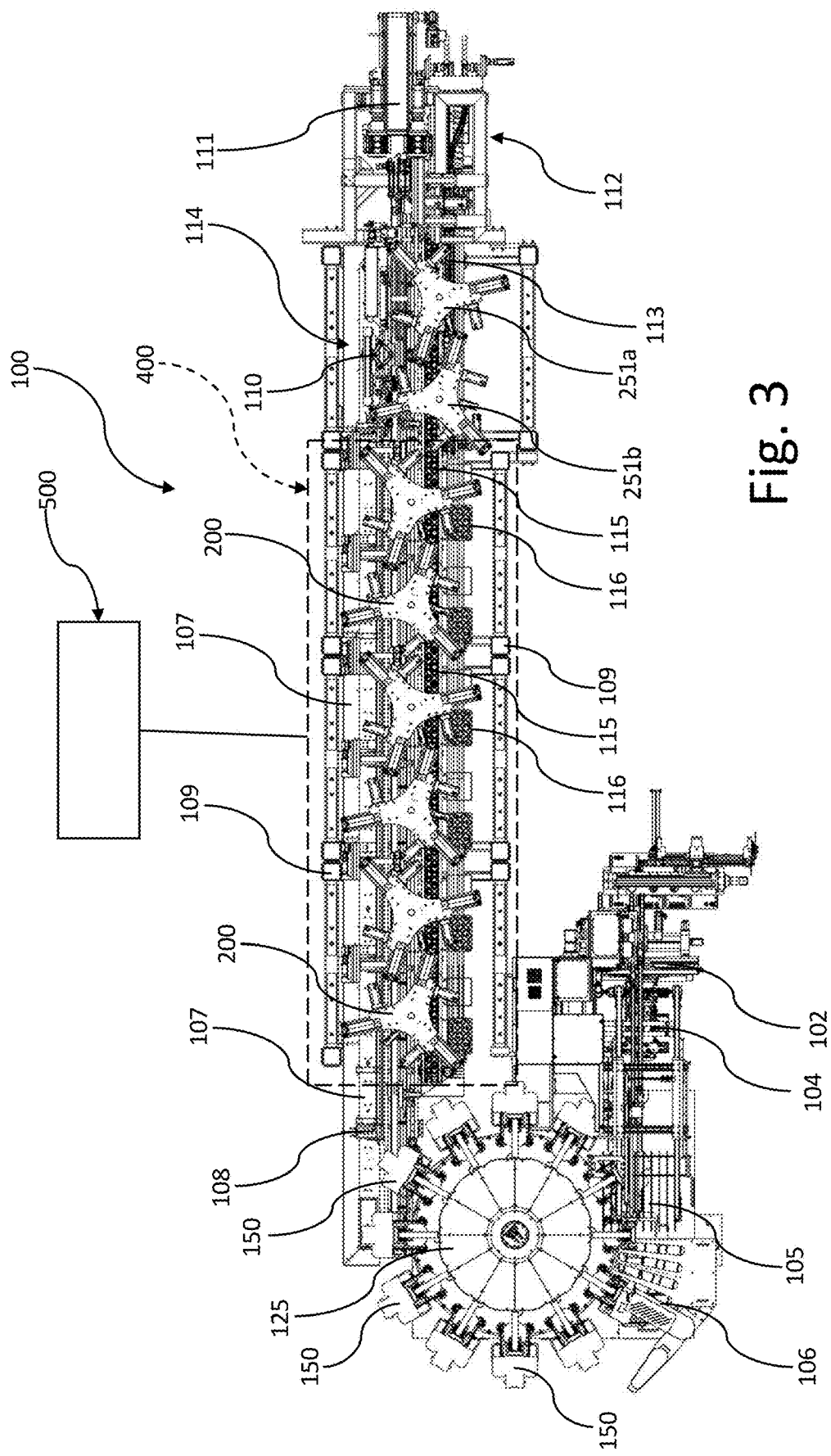
FIG. 3 shows a plan view from above of the packaging apparatus in FIG. 1.
Figure 4:
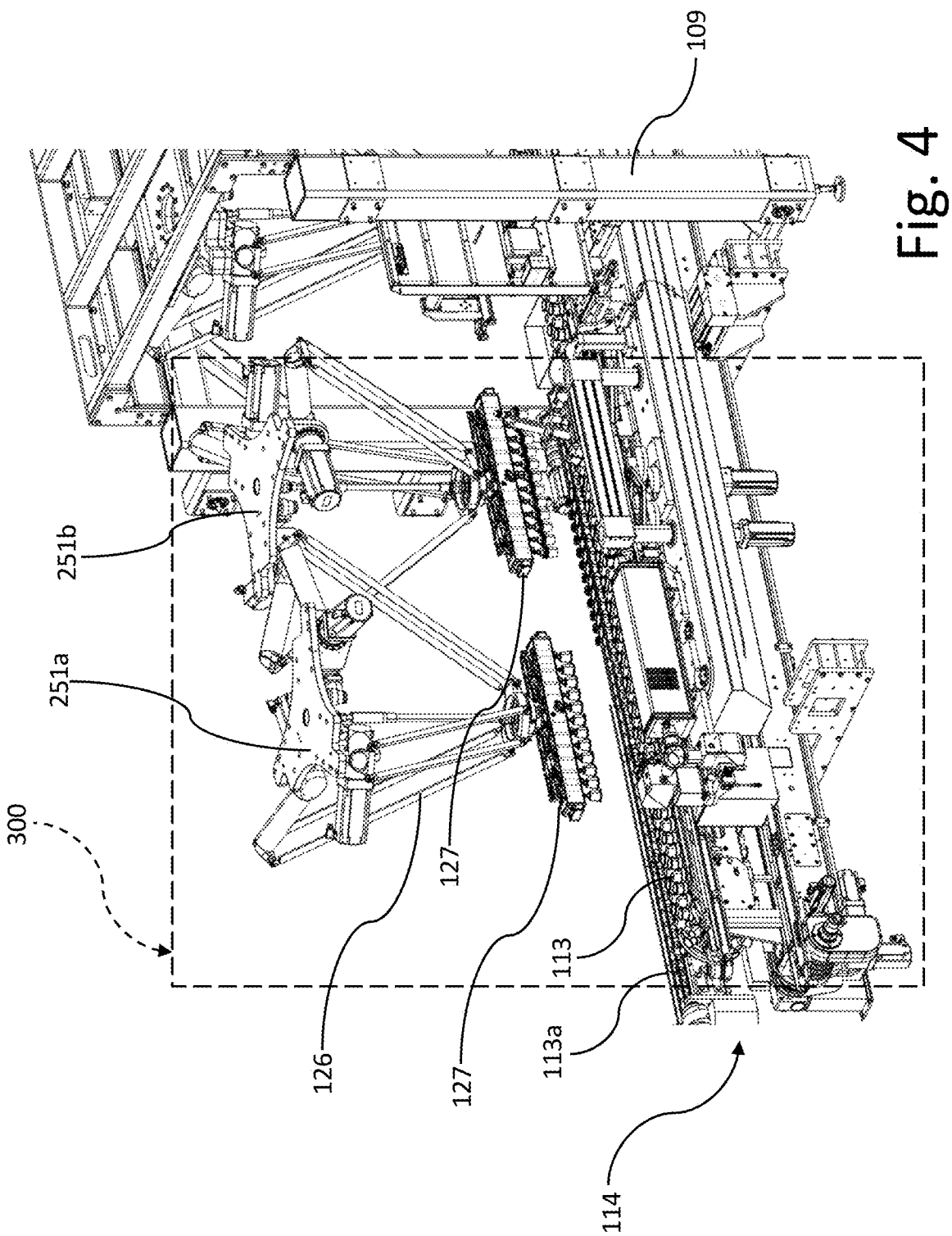
FIG. 4 shows a first partial perspective view of the packaging apparatus in the previous figures.
Figure 7:
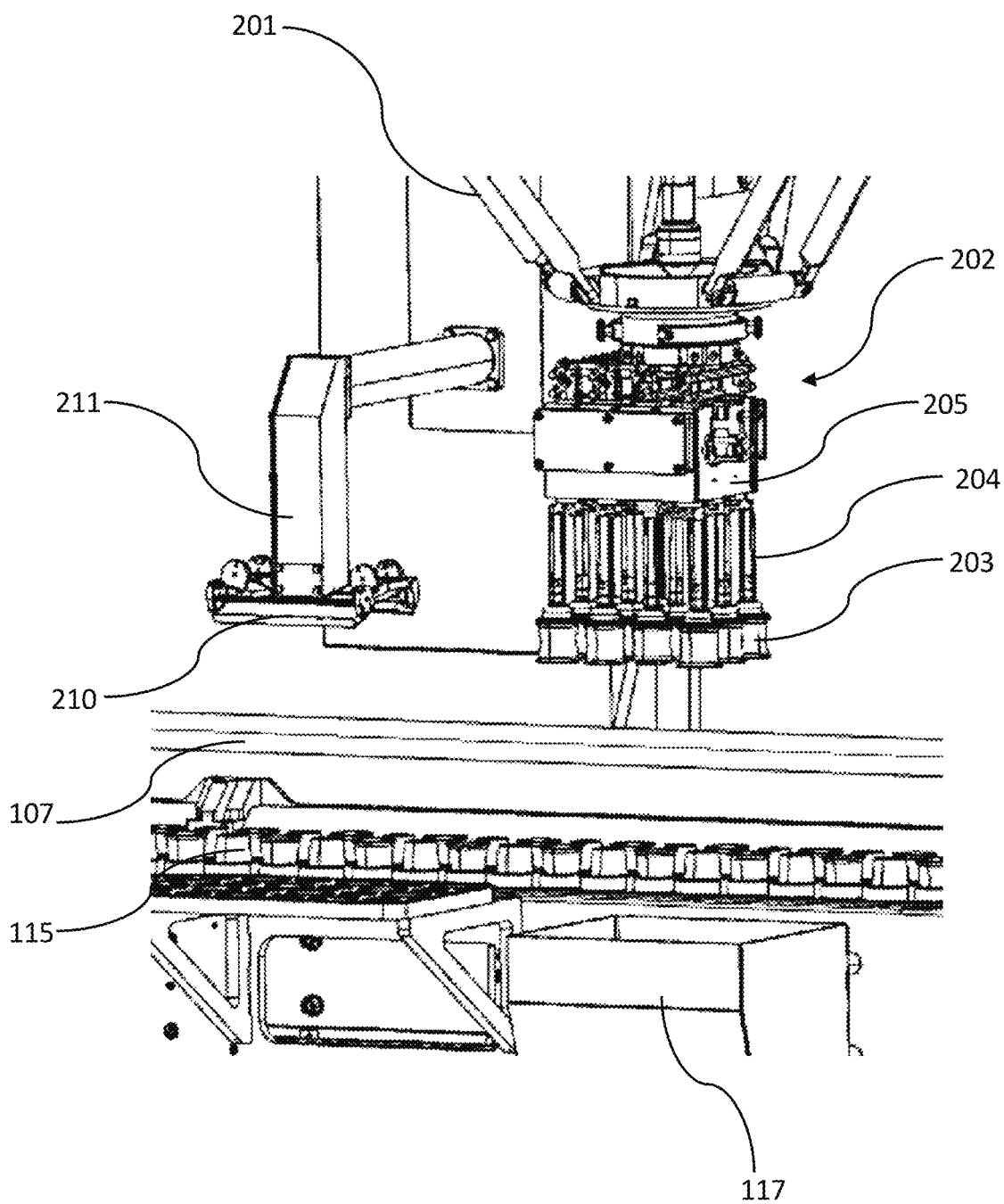
FIG. 7 shows a side view of the device of FIG. 5.
Figure 10:
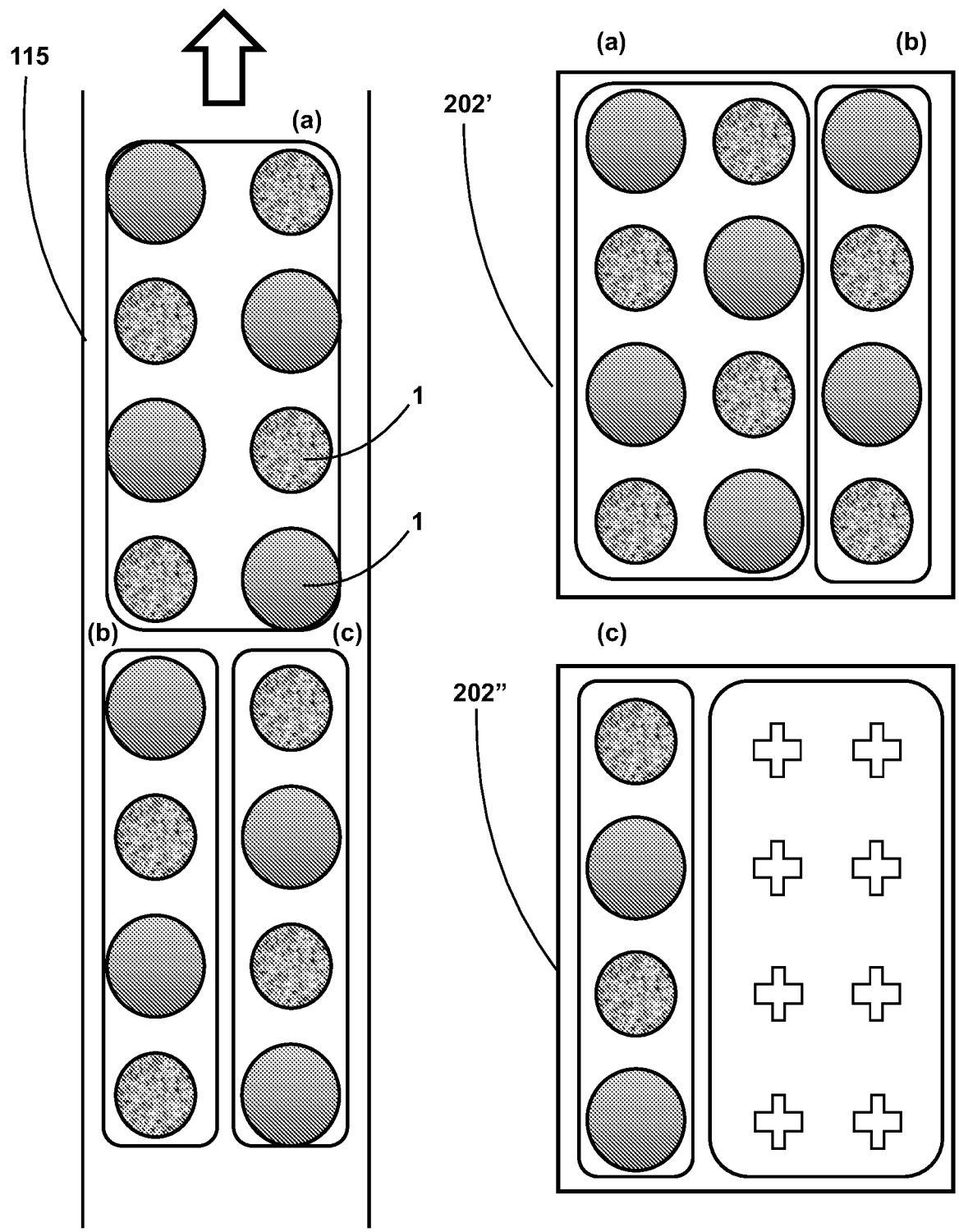
FIG. 10 illustrates a step in the packaging process according to the invention.

It should be noted that, in this embodiment, the gripping elements 203 are of two types: a first type 203' which is provided to grip the head 4 of the capsule 1, and a second type 203" which is provided to grip the bottom of the capsule 1 (FIG. 10).

The gripping elements 203 operate by vacuum suction, as they consist of special suction cups of different sizes. A suction circuit is formed internally to the support 204, which is connected to a suction device by means of hydraulic conduits 208 controlled by solenoid valves 209 which are in turn operated by the control unit (FIG. 6).

Further solenoid valves may be positioned in the second gripping device 202, constituting a suction blocking member in order to disable the single gripping elements 203, or a portion thereof.

Approaching and staggering the capsules 1 of each layer 38 grasped by the second gripping device 202 allows the insertion of the layer into a smaller box-shaped packaging.

An example of picking up and forming a layer is described with reference to FIG. 10.

The first conveyor line 115 feeds capsules 1 in an upright and upturned arrangement in two rows, with a checkerboard pattern.

In this example, the layer to be formed has a 3×4 format, and therefore its cross dimension, i.e. three, exceeds the cross dimension of the first conveyor line 115, which has two capsules 1.

To compose an entire layer, the second gripping device 202' performs a first picking (a) on a section of conveyor line 115 along four capsules: the four gripping elements 203 that are not engaged can be advantageously disabled.

At this point, the second gripping device 202' performs a second picking (b) from a single row 115a of the conveyor line 115, with the precaution of maintaining, in the set of capsules that have been picked up, a checkerboard pattern.

The eight gripping elements 203 that have already picked their respective capsules 1 continue to retain them.

It should be noted that the picking (b) in the figure is carried out from a portion immediately following that of picking (a), but only for graphic simplification: this limitation is not inherently required.

For the formation of a layer to be deposited by superimposing it with the previously picked layer, it is possible to carry out a picking (c) by exploiting the row 115b next to the previous picking (b).

It should be noted that this next layer also has a checkerboard pattern but, compared to the previous one, the positions of the upright and upturned capsules 1 are reversed.

If the second gripping device 202" of the next layer, which is not necessarily the same gripping device 202' as the previous layer but may belong to a second subsequent transfer device 200, picks up a single row of capsules first, the eight gripping elements 203 that are not engaged may possibly be disabled.

If, as an initial input, an incomplete layer, for example 3×3, is to be deposited as the last top layer, the operations described above will be carried out on portions of length equal to three capsules 1 only, and the gripping elements 203 not engaged can be disabled.

In this embodiment, for each second transfer device 200, the packaging device 400 comprises an image detecting device 210, in particular a digital camera, connected to the control unit. However, it is understood that the packaging device 400 could have a number of cameras lower than the number of the second transfer devices 200, but a camera can be enslaved to more than a second transfer device 200.

In this example, the image detecting device 210 is positioned downstream of each transfer device 200 relative to the second conveyor line 107, to detect, after insertion, the conformity of the layers 38 deposited in the box-shaped packagings of the flow associated with the second conveyor line 107.

In the present example, the camera operates with a focal spacing corresponding to the spacing between its lens and the layer to be detected, so as to distinguish the presence or absence of the layer.

The camera is positioned by a fixed support 211 above the second conveyor line 107, at a predetermined spacing from the respective second transfer device 200.

Therefore, the image detecting device 210 further comprises an image processing unit capable of analysing the images detected by the camera and comparing them with a control image, corresponding to a correct arrangement of the layer, in order to detect any discrepancies. The image processing unit is then able to output a signal for correct laying of the layer, or an alarm signal corresponding for incorrect laying of the layer, and to transmit this signal to the control unit. It should be noted that the image processing unit can be physically positioned either at the camera or at the control unit.

The packaging device 400 comprises a plurality of buffers 116, arranged in the region said first conveyor line 115, apt to receive capsules 1 therein deposited by the second transfer devices 200 in case it is impossible to insert them in the target packaging.

In particular, in combination with said image detecting devices 210 and signals provided to the control unit, the second transfer devices 200 lay the capsules subsequent to a signal of incorrect formation of a previous layer, so that the capsules are not laid in a packaging intended to be discarded.

The buffers 116 comprise support planes which are positioned close to the second transfer devices 200, on which the capsules are placed in a predetermined arrangement.

In this respect, the support planes have respective recesses to receive a single capsule each, thus identifying said predetermined arrangement.

The control unit, by means of the second transfer devices 200, can in due course provide for the picking of the capsules 1 from said buffers 116 for their transfer to subsequent target packagings. On this occasion, the forwarding station 112 will interrupt the flow of capsules 1 on the inlet line 121.

If, following a major malfunction, the space in said buffers 116 is exhausted, recovery tanks 117 are present alongside the buffers 116, apt to receive excess capsules from the second transfer devices 200.

It is understood that containers, for which a lack of conformity with the instructions in relation to the deposit of the capsules, in particular of the layers of capsules transferred by the aforesaid transfer devices 200, has been detected, whether the container has nevertheless completed its filling or whether the container is still missing layers, the capsules of which are deposited in the buffers 116, this container, at the end of its conveyor line 107, is discarded by a diverter equipment which may be of a substantially conventional type.

The discarded material will then be recovered, if possible, and reintroduced to the packaging cycle.

Subsequently, the containers reach a discharge end 111, from where they are sent to a packaging apparatus.

To the above-described packaging apparatus and device and process for packaging articles to be packaged, a person skilled in the art may, in order to meet additional and contingent requirements, make numerous further modifications and variations, all of which are, however, within the scope of protection of the present invention as defined by the appended claims.

The invention claimed is:

1. A packaging device for articles to be packaged, supplied on a first conveyor line arranged according to a predetermined pick-up pattern having a first number of rows, the packaging device comprising:
   a second conveyor line, on which a flow of containers in an open configuration is transported, said containers configured to be filled with said articles to be packaged, arranged in one or more layers; and
   one or more transfer devices for picking up the articles to be packaged from said first conveyor line and laying the articles in respective containers of the flow in said second conveyor line, each said one or more transfer devices comprising a handling member connected to a respective gripping device, movable along three orthogonal axes, each gripping device having gripping members configured to pick one article to be packaged from said first conveyor line,
wherein the gripping members are arranged in such a configuration to form, on each gripping device, a single layer of articles to be packaged, each layer having a width greater than a width of the first number of rows, and each layer being obtained with several pickings of said articles from said first conveyor line to be placed, in a single operation, in a respective container of said flow.

2. The packaging device according to claim 1, which comprises a set of interchangeable gripping devices for each transfer device, the interchangeable gripping devices configured to provide differently sized layers of articles.

3. The packaging device according to claim 1, wherein each transfer device comprises a blocking member which is controlled by a control unit, in order to disable part of the gripping members.

4. The packaging device according to claim 3, wherein the gripping members operate by vacuum suction, said blocking member comprising one or more solenoid valves positioned in a suction circuit.

5. The packaging device according to claim 1, wherein said first conveyor line continuously operates at a predetermined speed.

6. The packaging device according to claim 1, wherein said second conveyor line operates continuously at a predetermined speed.

7. The packaging device according to claim 1, wherein said first and said second conveyor lines operate in counter-current with respect to each other.

8. The packaging device according to claim 1, wherein said first conveyor line comprises articles to be packaged, arranged in an upright and in an upturned arrangement according to said predetermined pick-up pattern, said articles being staggered and alternating with each other.

9. The packaging device according to claim 1, further comprising:
one or more image detecting devices, each corresponding to one or more transfer devices and positioned downstream with respect to the flow of containers, said one or more image detecting devices being configured to detect conformity of laid layers of articles;
a control unit configured to receive a confirmation signal, from a respective image detecting device, confirming a correct laying of the layers, or an alarm signal in case of an incorrect laying; and
a plurality of buffers arranged at said first conveyor line, configured to receive the articles placed by said transfer device, so that, when the control unit receives the alarm signal, the transfer devices place in said buffers the articles for a container related to the alarm signal.

10. The packaging device according to claim 9, wherein said control unit provides, through the transfer devices, for picking of the articles from said buffers for a transfer of the articles into the containers of said flow.

11. A packaging device according to claim 1, wherein said first number of rows of the predetermined pick-up pattern of the first conveyor line is two rows.

12. A packaging apparatus comprising the packaging device according to claim 1.

13. A packaging process for articles to be packaged, the articles fed on a first conveyor line according to a predetermined pick-up pattern having a first number of rows, for packaging the articles in respective containers arranged in a flow in a second conveyor line in an open configuration, the process comprising:
a picking step of picking articles to be packaged from said first conveyor line, performed by a plurality of transfer devices, each having a gripping device for picking the articles from said first conveyor line;
a transfer step of articles from said first conveyor line to said second conveyor line; and
a placing step of placing, in a single operation, at least one single layer of said articles in a respective container of said flow,
wherein said picking step comprises a formation step of performing several pickings from said first conveyor line to form a single layer of said articles on said gripping device, the single layer having a width, wherein the width is greater than a width of the first number of rows.

14. The packaging process according to claim 13, further comprising a step of selecting the gripping devices to format the single layer.

15. The packaging process according to claim 13, further comprising a step of partial deactivation of a gripping device of the gripping devices.

16. The packaging process according to claim 13, wherein said first conveyor line operates continuously at a predetermined speed.

17. The packaging process according to claim 13, wherein said second conveyor line operates continuously at a predetermined speed.

18. The packaging process according to claim 17, wherein said first and said second conveyor lines operate in counter-current with respect to each other.

19. The packaging process according to claim 13, wherein said first conveyor line is composed of said articles to be packaged arranged in an upright and in an upturned arrangement according to said predetermined pick-up pattern, said articles being staggered and alternating with each other.

20. The packaging process according to claim 13, further comprising:
an image detection step of layers formed in said formation step,
wherein, in case of incorrect formation of the layers, the process further comprises an activation step of a non-conformity signal for the already inserted layers, followed by a laying step of laying the articles, subsequent to said picking step, in buffers arranged at said first conveyor line.

21. The packaging process according to claim 20, further comprising, after the laying step:
a step of picking the articles from said buffers,
a step of transferring said buffers to said second conveyor line, and
a complementary step of forming additional layers of articles by laying the articles picked in a container of said flow.

22. A packaging process according to claim 13, wherein said first number of rows of the predetermined pick-up pattern of the first conveyor line is two rows.

* * * * *